United States Patent
Toriumi et al.

(10) Patent No.: US 11,483,419 B2
(45) Date of Patent: Oct. 25, 2022

(54) PROTOCOL CONVERTER CONNECTABLE BETWEEN FIELD DEVICE AND DEVICE CONTROL APPARATUS, AND DATA TRANSMISSION BY PROTOCOL CONVERTER

(71) Applicant: YOKOGAWA ELECTRIC CORPORATION, Musashino (JP)

(72) Inventors: Shohei Toriumi, Musashino (JP); Koji Nagatomi, Musashino (JP); Hiroaki Nakajima, Musashino (JP); Hiroyuki Saito, Musashino (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 25 days.

(21) Appl. No.: 16/944,449

(22) Filed: Jul. 31, 2020

(65) Prior Publication Data
US 2021/0044677 A1   Feb. 11, 2021

(30) Foreign Application Priority Data
Aug. 8, 2019   (JP) .............................. JP2019-146756

(51) Int. Cl.
*H04L 69/08* (2022.01)
*G06F 13/20* (2006.01)

(52) U.S. Cl.
CPC .............. *H04L 69/08* (2013.01); *G06F 13/20* (2013.01)

(58) Field of Classification Search
CPC .................................. G06F 13/20; H04L 69/08
See application file for complete search history.

(56) References Cited

U.S. PATENT DOCUMENTS

| | | | |
|---|---|---|---|
| 4,175,287 A | | 11/1979 | Fuhrman |
| 5,842,045 A | * | 11/1998 | Nakamura ................ H04L 9/40 710/63 |
| 6,061,714 A | * | 5/2000 | Housel, III ........... H04L 69/329 709/203 |
| 2004/0022099 A1 | | 2/2004 | Ozawa |
| 2005/0135429 A1 | * | 6/2005 | Bingham .............. H04J 3/0664 370/503 |
| 2007/0079028 A1 | | 4/2007 | Hall |
| 2009/0006862 A1 | * | 1/2009 | Alkove .................... G06F 21/10 713/189 |
| 2016/0246961 A1 | * | 8/2016 | Wang .................... G06F 21/554 |
| 2017/0070362 A1 | * | 3/2017 | Tappeiner .......... G05B 19/0426 |

FOREIGN PATENT DOCUMENTS

| | | |
|---|---|---|
| CN | 101366000 A | 2/2009 |
| JP | 3-127204 A | 5/1991 |

* cited by examiner

*Primary Examiner* — Jeong S Park
(74) *Attorney, Agent, or Firm* — WHDA, LLP

(57) ABSTRACT

A protocol converter is configured to be connectable between a field device and a device control apparatus and includes a converter controller and a converter storage. The converter controller acquires field data from the field device, writes the field data to the converter storage as a data set formed by a plurality of pieces of data and changes the value of a first counter controlled by the converter controller when the value of the first counter and the value of a second counter controlled by the device control apparatus are equal, and stops an operation to write the field data to the converter storage when the value of the first counter and the value of the second counter are different.

8 Claims, 7 Drawing Sheets

FIG. 2

| Address of storage area | 1 | 2 | 3 | 4 |
|---|---|---|---|---|
| Data stored during period P1 | Ver.1 | Ver.1 | Ver.1 | Ver.1 |
| Data stored during period P2 | Ver.2 | Ver.2 | Ver.2 | Ver.2 |
| Data read from addresses 1 and 2 during period P1 and from addresses 3 and 4 during period P2 | Ver.1 | Ver.1 | Ver.2 | Ver.2 |

PROTOCOL CONVERTER CONNECTABLE BETWEEN FIELD DEVICE AND DEVICE CONTROL APPARATUS, AND DATA TRANSMISSION BY PROTOCOL CONVERTER

CROSS-REFERENCE TO RELATED APPLICATION

The present application claims priority to and the benefit of Japanese Patent Application No. 2019-146756 filed Aug. 8, 2019, the entire contents of which are incorporated herein by reference.

TECHNICAL FIELD

The present disclosure relates to a protocol converter, a data transmission system, a data transmission method, and a non-transitory computer-readable medium.

BACKGROUND

To transmit information between a controller and a controlled device, a system that includes an information transmission memory accessible from both the controller and the controlled device is known. For example, see patent literature (PTL) 1.

CITATION LIST

Patent Literature

PTL 1: JPH3-127204A

SUMMARY

A protocol converter according to an embodiment is configured to be connectable between a field device and a device control apparatus and includes a converter controller and a converter storage. The converter storage is configured to have data written thereto and read therefrom by the converter controller and the device control apparatus and is configured to store a first counter controlled by the converter controller and a second counter controlled by the device control apparatus. The converter controller is configured to acquire field data from the field device, to write the field data to the converter storage as a data set formed by a plurality of pieces of data and change a value of the first counter when the value of the first counter and a value of the second counter are equal, and to stop an operation to write the field data to the converter storage when the value of the first counter and the value of the second counter are different.

A data transmission system according to an embodiment includes the aforementioned protocol converter, a device control apparatus, and a storage apparatus configured to function as the aforementioned converter storage. The device control apparatus is configured to acquire the field data written to the storage apparatus and copy the value of the first counter to the second counter when the value of the first counter and the value of the second counter are different.

A data transmission method according to an embodiment is a data transmission method to be executed by a protocol converter configured to be connectable between a field device and a device control apparatus and including a converter storage. The data transmission method includes acquiring field data from the field device, writing the field data to the converter storage as a data set formed by a plurality of pieces of data and changing a value of a first counter controlled by the protocol converter when the value of the first counter and a value of a second counter controlled by the device control apparatus are equal, and stopping an operation to write the field data to the converter storage when the value of the first counter and the value of the second counter are different.

A non-transitory computer-readable medium according to an embodiment stores a data transmission program. The data transmission program includes instructions which, when executed by a protocol converter configured to be connectable between a field device and a device control apparatus and comprising a converter storage, cause the protocol converter to acquire field data from the field device, write the field data to the converter storage as a data set formed by a plurality of pieces of data and change a value of a first counter controlled by the protocol converter when the value of the first counter and a value of a second counter controlled by the device control apparatus are equal, and stop an operation to write the field data to the converter storage when the value of the first counter and the value of the second counter are different.

BRIEF DESCRIPTION OF THE DRAWINGS

In the accompanying drawings:

FIG. 2 illustrates a configuration example of data read by the data transmission system according to the comparative example;

DETAILED DESCRIPTION

Figure 1:
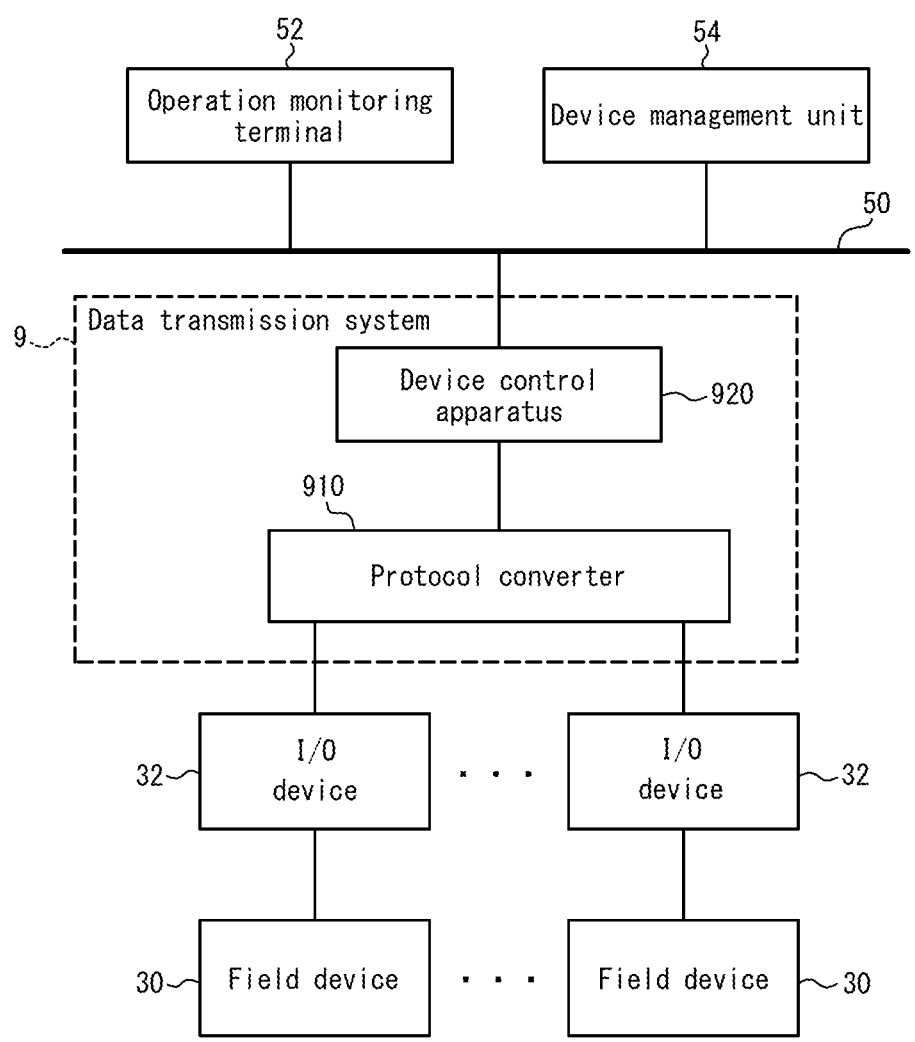
FIG. 1 is a block diagram illustrating a data transmission system according to a comparative example.

When a data set that includes a plurality of pieces of data is transmitted, the version of each piece of data in the data set needs to be matched. The version of the data may, for example, be identified by an acquisition time, a set time, a creation time, or the like of each piece of data. In other words, the data set needs to be synchronized.

The present disclosure aims to provide a protocol converter, a data transmission system, a data transmission method, and a non-transitory computer-readable medium capable of synchronizing and transmitting a data set.

A protocol converter according to an embodiment is configured to be connectable between a field device and a device control apparatus and includes a converter controller and a converter storage. The converter storage is configured to have data written thereto and read therefrom by the converter controller and the device control apparatus and is configured to store a first counter controlled by the converter controller and a second counter controlled by the device control apparatus. The converter controller is configured to acquire field data from the field device, to write the field data to the converter storage as a data set formed by a plurality of pieces of data and change a value of the first counter when the value of the first counter and a value of the second counter are equal, and to stop an operation to write the field data to the converter storage when the value of the first counter and the value of the second counter are different. This configuration can easily match the version of each piece of data forming a data set read by the device control apparatus. Consequently, the data set is synchronized and then transmitted.

In the protocol converter according to an embodiment, the converter controller may be configured to change the value of the first counter when a predetermined time or longer elapses after the last time the converter controller changes the value of the first counter. This enables recovery from the deadlock state. Consequently, the reliability of data transmission operations increases.

The protocol converter according to an embodiment may be configured to be connectable to the device control apparatus via a data bus. This configuration enables connection to an open network. The convenience of the protocol converter thereby improves.

A data transmission system according to an embodiment includes the aforementioned protocol converter, a device control apparatus, and a storage apparatus configured to function as the aforementioned converter storage. The device control apparatus is configured to acquire the field data written to the storage apparatus and copy the value of the first counter to the second counter when the value of the first counter and the value of the second counter are different. This configuration can easily match the version of each piece of data forming a data set read by the device control apparatus. Consequently, the data set is synchronized and then transmitted.

A data transmission method according to an embodiment is a data transmission method to be executed by a protocol converter configured to be connectable between a field device and a device control apparatus and including a converter storage. The data transmission method includes acquiring field data from the field device, writing the field data to the converter storage as a data set formed by a plurality of pieces of data and changing a value of a first counter controlled by the protocol converter when the value of the first counter and a value of a second counter controlled by the device control apparatus are equal, and stopping an operation to write the field data to the converter storage when the value of the first counter and the value of the second counter are different. This configuration can easily match the version of each piece of data forming a data set read by the device control apparatus. Consequently, the data set is synchronized and then transmitted.

A non-transitory computer-readable medium according to an embodiment stores a data transmission program. The data transmission program includes instructions which, when executed by a protocol converter configured to be connectable between a field device and a device control apparatus and comprising a converter storage, cause the protocol converter to acquire field data from the field device, write the field data to the converter storage as a data set formed by a plurality of pieces of data and change a value of a first counter controlled by the protocol converter when the value of the first counter and a value of a second counter controlled by the device control apparatus are equal, and stop an operation to write the field data to the converter storage when the value of the first counter and the value of the second counter are different. This configuration can easily match the version of each piece of data forming a data set read by the device control apparatus. Consequently, the data set is synchronized and then transmitted.

The present disclosure provides a protocol converter, a data transmission system, a data transmission method, and a non-transitory computer-readable medium capable of synchronizing and transmitting a data set.

Comparative Example

As illustrated in FIG. 1, a data transmission system 9 according to a comparative example includes a protocol converter 910 and a device control apparatus 920. The protocol converter 910 is communicably connected to a plurality of field devices 30 individually via an I/O device 32. A state in which a plurality of components are communicably connected corresponds to a state in which data, information, or the like can be transmitted and received between each component. The device control apparatus 920 is communicably connected to an operation monitoring terminal 52 and a device management unit 54 via a data bus 50. The operation monitoring terminal 52 monitors the data and the state of the field devices 30 and outputs operation commands to the device control apparatus 920. The device management unit 54 manages instrumentation information of the field devices 30 and notifies the device control apparatus 920 of the instrumentation information.

The device control apparatus 920 outputs and acquires data by communication based on a first communication protocol. On the other hand, each field device 30 outputs and acquires data by communication based on a second communication protocol that differs from the first communication protocol. In this case, the data format acquirable by the device control apparatus 920 may differ from the data format outputted by the field device 30. Furthermore, the data format outputted by the device control apparatus 920 may differ from the data format acquirable by the field device 30.

The protocol converter 910 converts data formats to enable data transmission between devices that communicate with different communication protocols. The protocol converter 910 converts the data outputted by the field device 30 to data transmittable to the device control apparatus 920, thereby placing the data in a state acquirable by the device control apparatus 920. The state in which data is transmittable corresponds to a state such that the format of the data is receivable by the component to which data is transmitted.

For example, the size of the data transmittable to the device control apparatus 920 is limited by the communication interface of the device control apparatus 920. When the data size transmittable to the device control apparatus 920 is smaller than the size of field data, the protocol converter 910 divides the field data to place the field data in a state acquirable by the device control apparatus 920. The division of one piece of field data yields a plurality of pieces of data. The device control apparatus 920 can restore one piece of field data by combining the divided pieces of data. The device control apparatus 920 may output the restored piece of field data to the operation monitoring terminal 52 or may output at least a portion of the divided pieces of data to the operation monitoring terminal 52. The protocol converter 910 places the plurality of pieces of data one by one in a state acquirable by the device control apparatus 920. When the device control apparatus 920 acquires the data placed in the state acquirable by the device control apparatus 920, the data is transmitted from the protocol converter 910 to the device control apparatus 920. In other words, a plurality of pieces of data is transmitted from the protocol converter 910 to the device control apparatus 920 by time division.

When data is sequentially updated, the data before updating and the data after updating are distinguished between as separate versions of data. In other words, different versions of data exist. Version management is therefore necessary for each piece of data generated by division. If a portion of the plurality of pieces of data used for restoration is a different version of data, then the data restored from these pieces of data might be abnormal data. The version of each piece of data used for restoration needs to match in order to restore correct data from the divided data. The version of the data may, for example, be identified by an acquisition time, a set time, a creation time, or the like of the data before division.

The protocol converter 910 includes a storage area for storing data. The data that the protocol converter 910 writes to the storage area is stored in the storage area. The protocol converter 910 divides the data acquired from the field device 30 into a plurality of pieces of data and writes the data to the storage area. The device control apparatus 920 can read the divided pieces of data from the storage area and combine them to restore the data outputted by the field device 30. On the other hand, the protocol converter 910 divides the data acquired from the field device 30 and writes the data to the storage area regardless of the timing at which the device control apparatus 920 reads data.

As described above, the device control apparatus 920 can acquire data one piece at a time. The device control apparatus 920 acquires a plurality of pieces of data, divided from a predetermined version of data, one by one from the storage area. While the device control apparatus 920 is acquiring the divided data one by one, the protocol converter 910 might write a plurality of pieces of data divided from a different version of data in the storage area. For example, suppose that the storage location of data can be identified by addresses expressed as storage areas 1 to 4, as illustrated in FIG. 2. Suppose that, in period P1, four pieces of data divided from a version of data represented as Ver. 1 are stored at addresses 1 to 4 of the storage area. Further suppose that, in period P2, four pieces of data divided from a version of data represented as Ver. 2 are stored at addresses 1 to 4 of the storage area. Here, suppose that although the device control apparatus 920 starts to read the data at addresses 1 to 4 during period P1, the period changes to P2 in the middle of sequential reading. The device control apparatus 920 is assumed to read the data stored at addresses 1 and 2 during period P1 and to read the data stored at addresses 3 and 4 after the period changes to P2. In this case, the version of data read by the device control apparatus 920 from addresses 1 and 2 is Ver. 1, whereas the version of data read from addresses 3 and 4 is Ver. 2. A portion of the pieces of data acquired by the device control apparatus 920 is therefore data of a different version. The data restored based on these data could become abnormal data.

When a plurality of pieces of divided data are transmitted in the data transmission system 9 according to the comparative example, a portion of the plurality of pieces of data may be a different version of data, as described above. The version of each piece of transmitted data needs to be matched. A plurality of pieces of data can be synchronized by matching the version of the pieces of data.

The present disclosure therefore describes a protocol converter 10 (see FIG. 3), a data transmission method, a data transmission program, and a data transmission system 1 (see FIG. 3) capable of synchronizing transmitted data.

Embodiments

Figure 3:
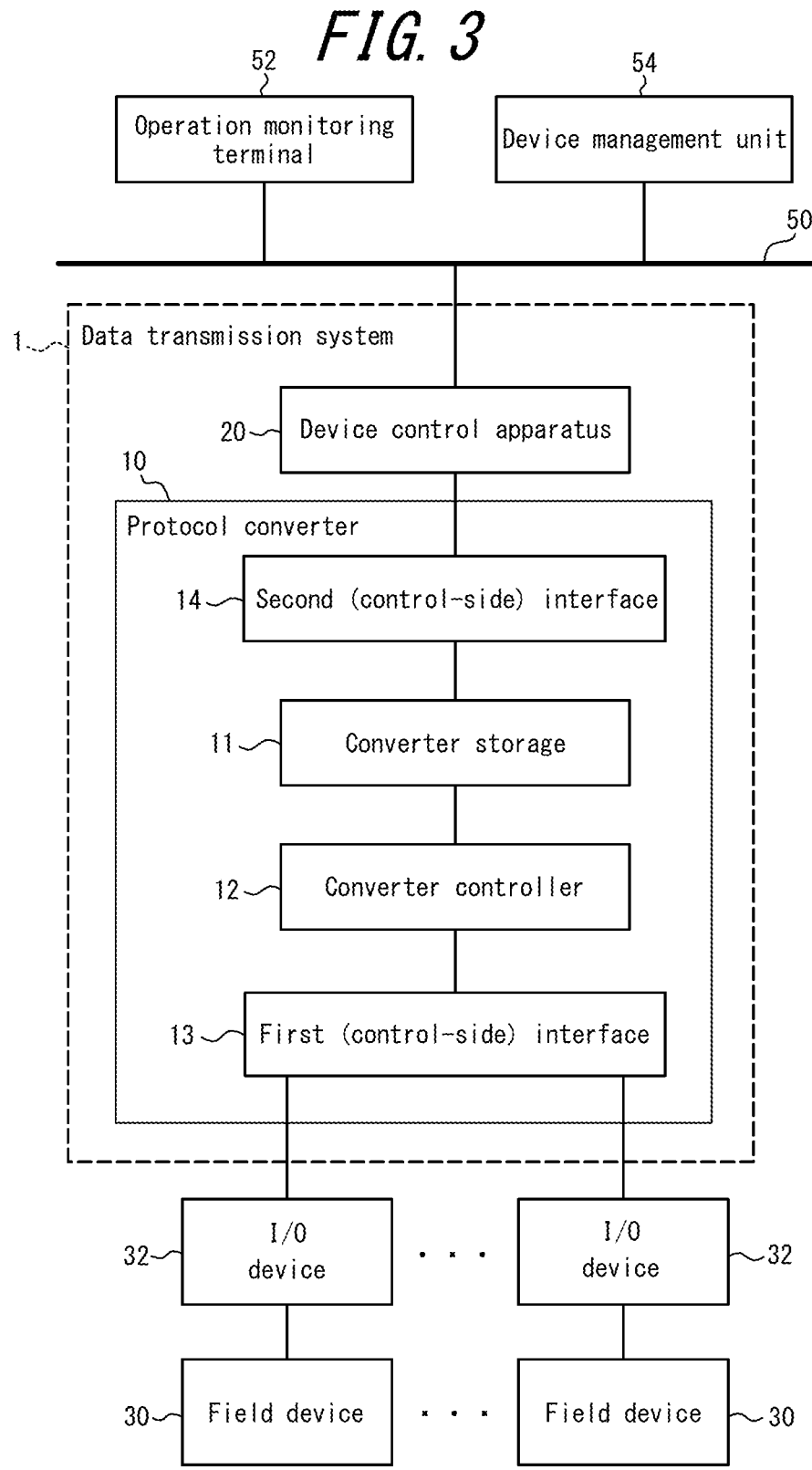
FIG. 3 is a block diagram illustrating an example configuration of a data transmission system according to an embodiment.

As illustrated in FIG. 3, a data transmission system 1 according to an embodiment of the present disclosure includes a protocol converter 10 and a device control apparatus 20.

The device control apparatus 20 is communicably connected to field devices 30 via the protocol converter 10. In other words, the protocol converter 10 is configured to be connectable between the field devices 30 and the device control apparatus 20. A state in which a plurality of components are communicably connected corresponds to a state in which data, information, or the like can be transmitted and received between each component. The device control apparatus 20 acquires data from the field device 30 via the protocol converter 10. The protocol converter 10 converts the data acquired from the field device 30 to data transmittable to the device control apparatus 20. The state in which data is transmittable corresponds to a state such that the format of the data is receivable by the component to which data is transmitted. This configuration enables the device control apparatus 20 to acquire data from the field device 30 regardless of the specifications of the field device 30.

The device control apparatus 20 performs calculations based on the data acquired from the field device 30, generates data to output to the field device 30, and outputs the data to the field device 30 via the protocol converter 10. The protocol converter 10 converts the data outputted by the device control apparatus 20 to data transmittable to the field device 30. This configuration enables the device control apparatus 20 to output data to the field device 30 regardless of the specifications of the field device 30.

The data that the device control apparatus 20 outputs to the field device 30 may, for example, include information providing feedback to the field device 30 or information to control the field device 30. The device control apparatus 20 is communicably connected to an operation monitoring terminal 52 and a device management unit 54 via a data bus 50. The data bus 50 may, for example, include the Ethernet® (Ethernet is a registered trademark in Japan, other countries, or both) or a control bus. The data bus 50 may be connectable to devices that form an open process automation system. The operation monitoring terminal 52 monitors the data and the state of the field device 30 and outputs operation commands to the device control apparatus 20. The device management unit 54 manages instrumentation information of the field devices 30 and outputs the instrumentation information to the device control apparatus 20. Based on the operation commands outputted by the operation monitoring terminal 52 and the instrumentation information acquired from the device management unit 54, the device control apparatus 20 may generate data to output to the field device 30.

The device control apparatus 20 is assumed to perform data communication based on a first communication protocol. On the other hand, each field device 30 is assumed to perform data communication based on a second communication protocol that differs from the first communication protocol. In this case, the data format for which transmission is possible between the device control apparatus 20 and a second interface 14 may differ from the format of data outputted by the field device 30 and the format of data acquired by the field device 30. The data outputted by the field device 30 is also referred to as field data. The data that the device control apparatus 20 outputs of the field device 30 is also referred to as control data.

The protocol converter 10 converts the data format in association with the communication protocol to enable data transmission between devices that communicate with different communication protocols. The protocol converter 10 converts the field data acquired from the field device 30 to data transmittable to the device control apparatus 20, thereby placing the field data in a state acquirable by the device control apparatus 20. The device control apparatus 20 outputs the control data as data transmittable to the protocol converter 10. The protocol converter 10 converts the data acquired from the device control apparatus 20 to control data for output to the field device 30 and outputs the control data to the field device 30. This configuration enables the protocol converter 10 to transmit data between the field device 30 and the device control apparatus 20 regardless of the data format of the field device 30.

The protocol converter 10 includes a converter storage 11, a converter controller 12, a first interface 13, and the second interface 14. The protocol converter 10 is communicably connected to an input/output (I/O) device 32 and the field device 30 in the first interface 13. The first interface 13 is also referred to as a device-side interface. The device-side interface may include a communication line that connects to the I/O device 32. The protocol converter 10 acquires data outputted by the field device 30 via the I/O device 32. The protocol converter 10 is communicably connected to the device control apparatus 20 in the second interface 14. The second interface 14 is also referred to as a control-side interface. The control-side interface may include a communication line that connects to the device control apparatus 20. The second interface 14 may be connected to the data bus 50 and be connected to the device control apparatus 20 via the data bus 50. This configuration enables the protocol converter 10 to connect to an open network. The convenience of the protocol converter 10 thereby improves.

The protocol converter 10 uses the first interface 13 to acquire data from the field device 30 via the I/O device 32 and to output data to the field device 30. The protocol converter 10 converts data, so that the device control apparatus 20 can acquire the data via the second interface 14, and acquires data from the device control apparatus 20.

The converter storage 11 has a storage area such that data can be written to or read from a designated position. The protocol converter 10 stores data acquired from the field device 30 by writing the data to the converter storage 11 in a state acquirable by the device control apparatus 20. The device control apparatus 20 is communicably connected to the converter storage 11 via the second interface 14. The device control apparatus 20 can read data from the converter storage 11 and write data to the converter storage 11. In other words, the device control apparatus 20 is capable of accessing the converter storage 11. Accordingly, the device control apparatus 20 can acquire data stored in the converter storage 11.

The converter storage 11 may, for example, be configured as a semiconductor memory or the like, or as a storage medium such as a magnetic disk. When the converter storage 11 is configured as a semiconductor memory, the position for writing or reading data may be designated by an address. When the converter storage 11 is configured as a magnetic disk, the position for writing or reading data may be designated by a sector number or the like. The converter storage 11 may be configured separately from the protocol converter 10 instead of being included in the protocol converter 10. When configured separately from the protocol converter 10, the converter storage 11 is also referred to as a storage apparatus. In other words, the data transmission system 1 may include the protocol converter 10 and the storage apparatus as separate components.

The converter controller 12 converts the field data acquired by the first interface 13 to data transmittable to the device control apparatus 20 and stores the data by writing the data to the converter storage 11 in a state acquirable by the device control apparatus 20. The converter controller 12 may be configured by one or more processors. The processor may be configured by a general-purpose integrated circuit, such as a central processing unit (CPU). The processor may implement various functions by executing a predetermined program. The processor may include a processor storage. The processor storage may store various information used for operations of the processor, programs for the processor to implement the functions of the protocol converter 10, and the like. The processor storage may function as a working memory of the processor. The processor storage may, for example, be a semiconductor memory.

The first interface 13 is communicably connected to the I/O device 32. The first interface 13 generates data based on an electric signal inputted from the I/O device 32 and outputs the data to the protocol converter 10 as data for transmission from the field device 30 to the device control apparatus 20. The first interface 13 may acquire data for transmission from the device control apparatus 20 to the field device 30 from the protocol converter 10, convert the data to an electric signal, and output the electric signal to the I/O device 32. The electric signal may include a current signal or a voltage signal. The current signal may be an instrumentation reference signal controlled to be 4 mA or more and 20 mA or less.

The second interface 14 is communicably connected to the device control apparatus 20. The second interface 14 may transmit and receive digital signals to and from the device control apparatus 20. The format of data that can be transmitted between the protocol converter 10 and the device control apparatus 20 can be determined based on the specifications of the second interface 14. The specifications of the second interface 14 may include specifications of a communication line that connects to the device control apparatus 20. The protocol converter 10 converts the field data to data transmittable to the device control apparatus 20 and converts data transmitted from the device control apparatus 20 to data for output to the field device 30.

The protocol converter 10 may handle a plurality of pieces of data as one data set. For example, when a plurality of pieces of data divided from one piece of data is transmitted, and the original data is restored at the transmission destination, the divided pieces of data may be handled as one data set. As another example, when the field device 30 outputs a plurality of pieces of measurement data at a predetermined time, the pieces of measurement data may be handled as one data set.

The specifications of the communication line may include a communication volume. The communication volume corresponds to the data volume that can be transmitted or received between the second interface 14 and the device control apparatus 20 per unit time. The size of data that can be transmitted between the protocol converter 10 and the device control apparatus 20 can be determined based on the communication volume of the communication line. The size of data that can be transmitted between the protocol converter 10 and the device control apparatus 20 is also referred to as the transmission allowable size.

When the size of the field data is greater than the transmission allowable size, the converter controller 12 divides the field data into pieces of data equal to or less than the transmission allowable size and stores the data by writing the data to the converter storage 11 in a state acquirable by the device control apparatus 20. The device control apparatus 20 accesses the converter storage 11, acquires the data by reading the data that was divided and stored, and restores the field data. The plurality of pieces of data generated by division of one piece of field data form a restoration data set for restoring the one piece of field data.

When the size of the control data generated by the device control apparatus 20 based on the field data is greater than the allowable transmission size, the device control apparatus 20 divides the control data into pieces of data equal to or less than the transmission allowable size and stores the divided data by writing to the converter storage 11. The protocol converter 10 restores one piece of control data from the plurality of pieces of data stored in the converter storage 11 and outputs the restored control data to the field device 30 via the I/O device 32. The collection of a plurality of pieces of data yielded by dividing one piece of control data form a restoration data set for restoring the one piece of control data.

The divided data transmitted between the protocol converter 10 and the device control apparatus 20 is also referred to as fragmented data.

The plurality of pieces of data outputted by the field device 30 may be processed by the device control apparatus 20 in association with each other. The collection of pieces of data associated with each other by the device control apparatus 20 is also referred to as a related data set. The related data set may be configured as a collection of measured data measured at a predetermined time by the field device 30. The measured data forming the related data set may, for example, include process data such as the temperature or flow rate of a gas, the temperature or flow rate of a liquid, or the like at the predetermined time. The measurement data may, for example, include position data such as 3D coordinates or a rotation angle, or motion data such as velocity, acceleration, or angular velocity, at the predetermined time. The device control apparatus 20 can process the pieces of measurement data forming a related data set in association with each other to generate control data, from the measurement data at a predetermined time, for providing feedback to the control by the field device 30.

The device control apparatus 20 may output a plurality of pieces of data as control data to the field device 30. The field device 30 may execute one instance of control based on a plurality of pieces of data. A collection of data with instructions for one instance of control for the field device 30 is also referred to as a control data set. The control data forming the control data set may, for example, include the output of a heater that controls temperature, the degree of opening of a valve that controls flow, or the like. The control data forming the control data set may, for example, include the output of a motor, displacement of an actuator, or the like.

The restoration data set, the related data set, and the control data set are also collectively referred to simply as data sets. The second interface 14 connected between the protocol converter 10 and the device control apparatus 20 transmits the plurality of pieces of data forming a data set one piece at a time. In other words, the second interface 14 transmits a plurality of pieces of data between the protocol converter 10 and the device control apparatus 20 by time division.

When field data is sequentially updated, the field data before and after updating are distinguished between as separate versions of data. Accordingly, the version of each piece of data forming the data set corresponding to the field data needs to be managed. For example, when a portion of fragmented data forming a restoration data set is a different version, the field data restored from the data set might become abnormal data. The control data generated based on the restored field data may consequently become abnormal data. The version of each piece of data forming the restoration data set therefore needs to match. The version of the data may, for example, be identified by an acquisition time, a set time, a creation time, or the like of the field data.

When the field data is configured as a related data set as well, the version of the plurality of pieces of data forming the related data set needs to be managed. When a portion of the data forming the related data set is a different version, the control data generated based on the related data set might become abnormal data. The version of each piece of data forming the related data set therefore needs to match.

A state in which the version of each piece of data forming a data set matches corresponds to a state in which the data set is synchronized. In other words, the data set needs to be synchronized during data transmission between the protocol converter 10 and the device control apparatus 20. The protocol converter 10 can synchronize the data set by having the following configuration, for example.

Figure 4:
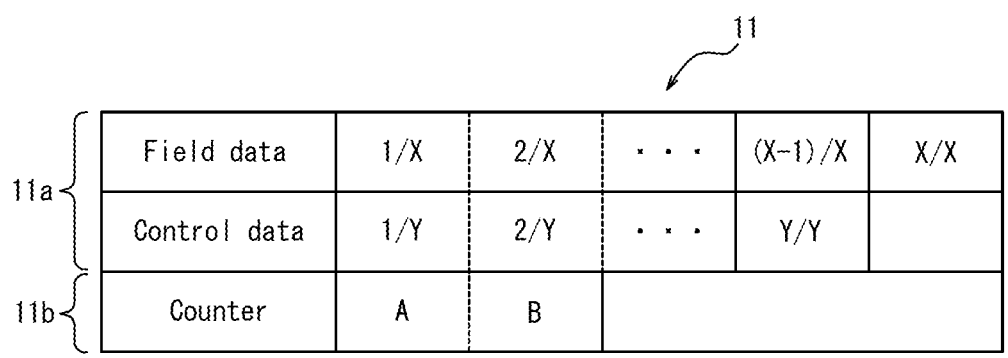
FIG. 4 illustrates a configuration example of a storage area included in a converter storage.

As illustrated in FIG. 4, the storage area of the converter storage 11 includes a transmission data area 11*a* for storing a data set to be transmitted between the field device 30 and the device control apparatus 20. The storage area of the converter storage 11 also includes a counter area 11*b* for storing a counter A and a counter B for synchronizing the data set. The transmission data area 11*a* includes an area for storing a data set corresponding to the field data transmitted from the field device 30 to the device control apparatus 20 and an area for storing a data set corresponding to the control data transmitted from the device control apparatus 20 to the field device 30. When the protocol converter 10 is connected to a plurality of field devices 30, the converter storage 11 includes a storage area corresponding to each field device 30. In other words, the converter storage 11 includes a transmission data area 11*a* and a counter area 11*b* for each field device 30.

The area storing the field data is divided into areas for storing each piece of data forming a data set. The data forming a data set may, for example, be data yielded by dividing field data into pieces having a size equal to or less than the transmission allowable size or may be measurement data forming a related data set. In the example in FIG. 4, the field data is stored as a data set configured by X pieces of data with numbers 1/X to X/X attached thereto. In other words, the field data is divided into X pieces of data and stored.

The area storing the control data is divided into areas for storing each piece of data forming a data set. The data forming a data set may be data yielded by dividing control data into pieces having a size equal to or less than the transmission allowable size or may be data forming a control data set. In the example in FIG. 4, the control data is stored as a data set formed by Y pieces of data with numbers 1/Y to Y/Y attached thereto. In other words, the control data is divided into Y pieces of data and stored.

The number (X) of pieces of data forming a data set corresponding to the field data and the number (Y) of pieces of data forming a data set corresponding to the control data may be the same or different.

The counter A and the counter B stored in the counter area 11*b* are also referred to as a first counter and a second counter. The value of the counter A is controlled by the converter controller 12 of the protocol converter 10. The value of the counter B is controlled by the device control apparatus 20. The value of the counter A is also simply expressed as A. The value of the counter B is also simply expressed as B.

Figure 5:
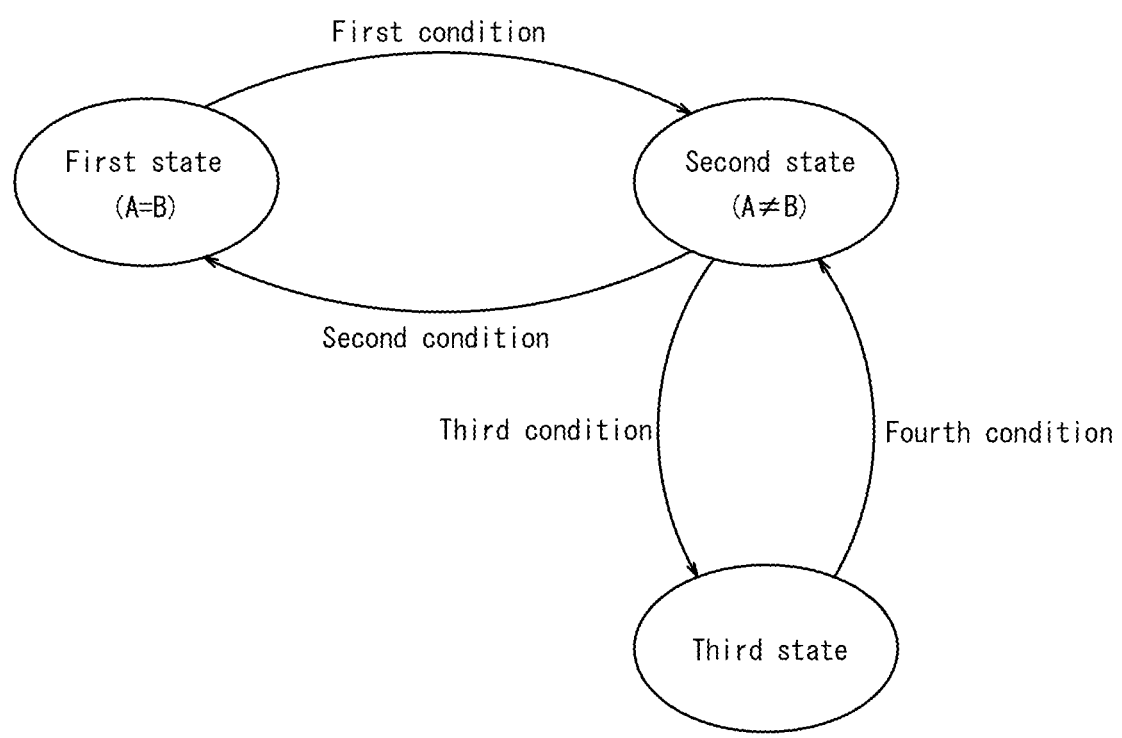
FIG. 5 is a state transition diagram representing an example of state transition of the data transmission system.

The data transmission system 1 operates based on the values of the counters A and B. As illustrated in FIG. 5, it is assumed that the data transmission system 1 operates while transitioning between a plurality of states based on the values of the counters A and B. The converter controller 12 acquires field data from the field device 30 via the I/O device 32 regardless of whether the value of the counter A and the value of the counter B match or differ.

The state in which A=B is referred to as a first state. In the first state, the converter controller 12 writes the field data to the transmission data area 11*a* of the converter storage 11. When the size of the field data is greater than the transmission allowable size, the converter controller 12 writes data yielded by dividing the field data to the converter storage 11 as data forming a restoration data set. When a plurality of pieces of measurement data is acquired as the field data, the converter controller 12 writes each piece of measurement data to the converter storage 11 as data forming a related data set.

When the device control apparatus 20 reads data from the converter storage 11 in the first state, the device control apparatus 20 discards the read field data without restoring it. This avoids the generation of control data based on field data read by the device control apparatus 20 from the transmission data area 11*a* while the protocol converter 10 is writing field data to the transmission data area 11*a*. Consequently, this configuration avoids a condition in which the version of a portion of data differs among the pieces of data forming the data set read by the device control apparatus 20.

The device control apparatus 20 does not write data to the converter storage 11. This prevents the device control apparatus 20 from writing control data to the transmission data area 11*a* while the protocol converter 10 is reading control data from the transmission data area 11*a*. Consequently, this configuration avoids a condition in which the version of a portion of data differs among the pieces of data forming the data set that the protocol converter 10 outputs to the field device 30.

Under the condition that all of the data forming a data set has been written to the converter storage 11, the converter controller 12 changes the value of the counter A to a different value than the current value and writes the result to the counter area 11*b* to change the value of the counter A.

The converter controller 12 may increment the value of the counter A. In this case, the counter A operates by counting up. The converter controller 12 may decrement the value of the counter A. In this case, the counter A operates by counting down. In other words, the converter controller 12 may change the value of the counter A by increasing or decreasing the counter A. The converter controller 12 may change the value of the counter A based on various other rules.

When the value of the counter A is changed during the first state in which A=B, the state transitions to A≠B. The state in which A≠B is referred to as a second state. The condition for transitioning from the first state to the second state is also referred to as a first condition. The first condition is satisfied by all of the data forming the data set corresponding to the field data being written to the converter storage 11.

The device control apparatus 20 reads data from the area storing the field data in the transmission data area 11*a* of the converter storage 11 regardless of whether the current state is the first state or the second state. When the device control apparatus 20 has read a restoration data set in the second state, the device control apparatus 20 restores the field data based on the pieces of data of the restoration data set. The device control apparatus 20 generates control data based on the restored field data. When the device control apparatus 20 has read a related data set, the device control apparatus 20 generates control data based on the pieces of data forming the related data set.

The device control apparatus 20 writes the generated control data to an area for storing control data in the transmission data area 11*a* of the converter storage 11. When the size of the control data is greater than the transmission allowable size, the device control apparatus 20 divides the control data and writes the result to the transmission data area 11*a*. The divided control data forms a control data set. When generating a plurality of pieces of control data forming a control data set, the device control apparatus 20 writes each piece of control data to the transmission data area 11*a*.

In the second state, the converter controller 12 does not write data to the transmission data area 11*a*. In other words, the converter storage 11 stops operations to write data to the transmission data area 11*a* of the converter storage 11 in the second state. This prevents the protocol converter 10 from writing field data to the transmission data area 11*a* while the device control apparatus 20 is reading field data from the transmission data area 11*a* in the second state. Consequently, this configuration avoids a condition in which the version of a portion of data differs among the pieces of data forming the data set read by the device control apparatus 20. In the second state, the converter controller 12 does not output data stored in the converter storage 11 to the field device 30. This prevents the protocol converter 10 from reading control data from the transmission data area 11*a* while the device control apparatus 20 is writing control data to the transmission data area 11*a* in the second state. Consequently, this configuration avoids a condition in which the version of a portion of data differs among the pieces of data forming the control data set outputted to the field device 30.

Under the condition that all of the data forming the data set corresponding to the field data has been read from the converter storage 11, the device control apparatus 20 changes the value of the counter B. The device control apparatus 20 changes the value of the counter B by writing the value of the counter A to the counter area 11*b* as the value of the counter B. In other words, the device control apparatus 20 changes the value of the counter B by copying the value of the counter A as the value of the counter B. The device control apparatus 20 may change the value of the counter B under the condition that all of the data forming the data set corresponding to the control data generated based on the read data has been written to the converter storage 11.

When the value of the counter B is changed in the second state in which A≠B, the state transitions to A=B, i. e. the first state. The condition for transitioning from the second state to the first state is also referred to as a second condition. The second condition is satisfied by all of the data forming the data set corresponding to the field data being read from the converter storage 11. Furthermore, the second condition may be satisfied by all of the data forming the data set corresponding to the control data being written to the converter storage 11.

When the device control apparatus 20 changes the value of the counter B in the second state, the operation to write the value of the counter B in the counter area 11*b* of the converter storage 11 sometimes fails. A failure when writing the counter B may, for example, occur due to the communication error between the device control apparatus 20 and the second interface 14. The communication error could occur due to noise on the communication line, for example.

The device control apparatus 20 includes a device control storage and stores the value of the counter B in the device control storage. By virtue of writing and storing the value of the counter B in the device control storage, the device control apparatus 20 need not read the counter B from the converter storage 11. The load of the device control apparatus 20 is thereby reduced.

When changing the value of the counter B, the device control apparatus 20 writes the value of the counter A as the value of the counter B stored in the device control storage and writes the value of the counter A as the value of the counter B stored in the counter area 11b of the converter storage 11. Regardless of whether the operation to write the value of the counter B to the counter area 11b succeeds or fails, the device control apparatus 20 recognizes the transition to the first state as a result of changing the value of the counter B stored in the device control storage. In this case, the device control apparatus 20 does not execute a data writing and reading process.

On the other hand, the protocol converter 10 recognizes that the state is still the second state when the operation to write the value of the counter B to the counter area 11b fails. The protocol converter 10 does not execute a data writing and reading process in this case.

When neither the protocol converter 10 nor the device control apparatus 20 operates, the data transmission system 1 enters a non-operating deadlock state. The deadlock state is also referred to as a third state. The condition for transitioning from the second state to the third state is also referred to as a third condition. The third condition is satisfied when the operation by the device control apparatus 20 to write the value of the counter B to the counter area 11b fails.

When the data transmission system 1 transitions to the third state, it becomes impossible to transition to the first state or the second state without further action, since neither the protocol converter 10 nor the device control apparatus 20 operates. In the third state, the data transmission system 1 causes the converter controller 12 to change the value of the counter A. A change in the value of the counter A enables the data transmission system 1 to transition from the third state to the second state. In other words, a change in the value of the counter A enables the data transmission system 1 to recover from the third state. This enables the data transmission system 1 to recover from a deadlock state with a simple configuration. Consequently, the reliability of data transmission operations in the data transmission system 1 increases.

The converter controller 12 may change the value of the counter A when a predetermined time has elapsed from the last change to the value of the counter A. In this case, the predetermined time may be set to four seconds, for example. The converter controller 12 may change the value of the counter A when recognizing that the current state is still the second state despite a predetermined time having elapsed from when the converter controller 12 recognized the transition to the second state. The condition for transitioning from the third state to the second state is also referred to as a fourth condition. The fourth condition is satisfied when the converter controller 12 changes the value of the counter A. The fourth condition may be considered to be satisfied when a predetermined time has elapsed from the last time the converter controller 12 changed the value of the counter A. The fourth condition may be considered to be satisfied when a predetermined time has elapsed from when the converter controller 12 recognized the transition to the second state.

The data transmission system 1 and the protocol converter 10 according to an embodiment can easily cause the version of each piece of data forming the data set read by the device control apparatus 20 to match. Furthermore, the data transmission system 1 and the protocol converter 10 according to an embodiment can easily cause the version of each piece of data forming the data set that the protocol converter 10 outputs to the field device 30 to match. Consequently, the data set is synchronized and then transmitted.

Figure 6:
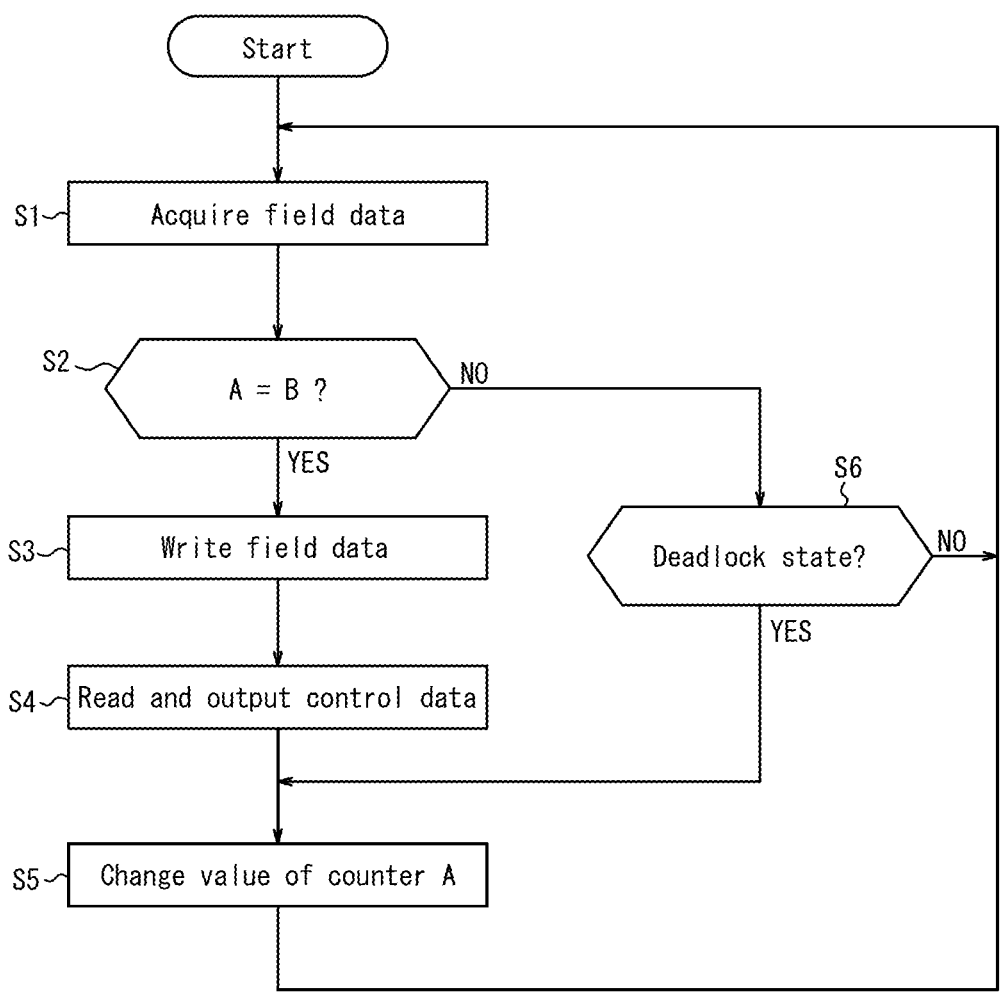
FIG. 6 is a flowchart illustrating an example of a data transmission method executed by a protocol converter.

The protocol converter 10 may execute the procedure illustrated in the flowchart of FIG. 6 as a data transmission method. The procedure illustrated in the flowchart of FIG. 6 may be implemented as a data transmission program executed by a processor. The data transmission program may be stored in a non-transitory computer-readable medium.

The converter controller 12 acquires the field data from the field device 30 (step S1). The converter controller 12 may acquire the field data regardless of whether A=B.

The converter controller 12 reads the values of the counters A and B stored in the counter area 11b of the converter storage 11 and judges whether A=B (step S2). The converter controller 12 may make the judgment by reading the values of the counters A and B stored in the counter area 11b of the converter storage 11. When A=B is not true (step S2: NO), the converter controller 12 proceeds to the procedure of step S6. In this case, the converter controller 12 may discard the field data acquired in step S1.

When A=B (step S2: YES), the converter controller 12 writes the field data in the transmission data area 11a of the converter storage 11 (step S3). The field data is thereby stored in the transmission data area 11a. When the size of the field data is greater than the transmission allowable size, the converter controller 12 may write data yielded by dividing the field data to the transmission data area 11a of the converter storage 11 as data forming a data set. When the converter controller 12 acquires a data set corresponding to field data, the converter controller 12 may write each piece of data forming the data set to the transmission data area 11a of the converter storage 11.

The converter controller 12 reads the control data written by the device control apparatus 20 to the converter storage 11 and outputs the control data to the field device 30 (step S4). The converter controller 12 may execute the procedure of step S4 simultaneously with the procedure of step S3 or before the procedure of step S3.

The converter controller 12 changes the value of the counter A (step S5). The converter controller 12 returns to the procedure of step S1 after step S5. The converter controller 12 may return to the procedure of step S2 after step S5.

When A=B is not true (step S2: NO), i.e. when A≠B, the converter controller 12 judges whether the data transmission system 1 has entered a deadlock state (step S6). The converter controller 12 may judge that the data transmission system 1 has entered a deadlock state when a predetermined time has elapsed from the last change to the value of the counter A. In this case, the predetermined time may be set to four seconds. The converter controller 12 may judge that the data transmission system 1 has entered a deadlock state when recognizing that the current state is still the second state despite a predetermined time having elapsed from when the converter controller 12 recognized the transition to the second state in which A≠B.

When the data transmission system 1 has entered the deadlock state (step S6: YES), the converter controller 12 proceeds to the procedure of step S5 and changes the value of the counter A. When the data transmission system 1 has not entered the deadlock state (step S6: NO), the converter controller 12 returns to the procedure of step S1.

Figure 7:
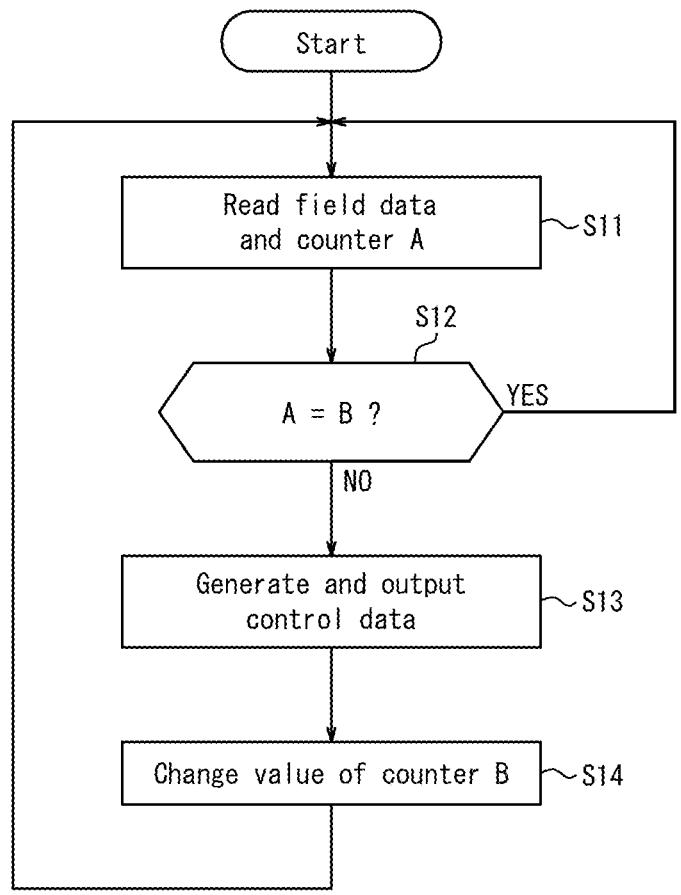
FIG. 7 is a flowchart illustrating an example of a data transmission method executed by a device control apparatus.

The device control apparatus 20 may execute the procedure illustrated in the flowchart of FIG. 7 as a data transmission method. The procedure in the flowchart illustrated in FIG. 7 may be implemented as a data transmission program.

The device control apparatus 20 reads the field data from the transmission data area 11a of the converter storage 11 and reads the value of the counter A from the counter area 11b of the converter storage 11 (step S11). The device control apparatus 20 may read the field data and the value of the counter A simultaneously or by time division.

The device control apparatus 20 judges whether A=B (step S12). The device control apparatus 20 includes a device control storage and stores the value of the counter B in the device control storage. The device control apparatus 20 compares the value of the counter B stored in the device control storage and the value of the counter A read from the converter storage 11.

When A=B (step S12: YES), the device control apparatus 20 returns to the procedure of step S11. When A=B is not true (step S12: NO), i.e. when A≠B, the device control apparatus 20 generates and outputs the control data based on the field data read in step S11 (step S13). The device control apparatus 20 outputs the control data by writing to the converter storage 11. When the size of the control data is greater than the transmission allowable size, the device control apparatus 20 writes a data set, formed by data yielded by dividing the control data, to the converter storage 11. When generating a plurality of pieces of data forming a control data set, the device control apparatus 20 writes each piece of control data to the converter storage 11.

The device control apparatus 20 changes the value of the counter B (step S14). The device control apparatus 20 writes the value of the counter A as the value of the counter B stored in the device control storage. Furthermore, the device control apparatus 20 writes the value of the counter B stored in the device control storage to the counter area 11b to change the value of the counter B stored in the converter storage 11. In other words, the device control apparatus 20 copies the value of the counter A as the value of the counter B to change the value of the counter B stored in the converter storage 11. The device control apparatus 20 returns to the procedure of step S11 after the procedure of step S14.

The data transmission method and data transmission program according to an embodiment can easily cause the version of each piece of data forming the data set read by the device control apparatus 20 to match. The version of each piece of data forming the data set that the protocol converter 10 outputs to the field device 30 can also easily be matched. Consequently, the data set is synchronized and then transmitted.

The data transmission system 1 according to the present embodiment can synchronize a data set by controlling the counter A and the counter B. When a flag is used to synchronize the data set as a comparative example, a bit representing the flag is included in the transmitted data. The data format is restricted in this case, and the actual data volume of transmitted data is reduced by the flag. Processing to interpret the content of the data also becomes necessary. The data transmission system 1 according to the present embodiment achieves a less restrictive data format and a greater data volume than the comparative example while synchronizing the data set. Furthermore, processing to interpret the content of data is unnecessary, and the load on the processor decreases.

Embodiments of the present disclosure have been described with reference to the drawings, but specific configurations are not limited to these embodiments, and a variety of modifications may be made without departing from the spirit and scope thereof.

The invention claimed is:

1. A protocol converter configured to be connected between a field device and a device control apparatus, the protocol converter comprising:
   a converter controller; and
   a converter storage;
   wherein the converter storage is configured to
   have data written thereto and read therefrom by the converter controller and the device control apparatus; and
   store a first counter controlled by the converter controller and a second counter controlled by the device control apparatus; and
   wherein the converter controller is configured to
   acquire field data from the field device;
   when a value of the first counter and a value of the second counter are equal, write the field data to the converter storage as a data set formed by a plurality of pieces of data without further interpreting a content of the data set and change the value of the first counter, regardless of elapsing of time, under the condition that all of the data forming the data set has been written to the converter storage; and
   when the value of the first counter and the value of the second counter are different, stop an operation to write the field data to the converter storage,
   wherein the protocol converter converts data outputted by the field device to data transmittable to the device control apparatus, thereby placing the data in a state acquirable by the device control apparatus.

2. The protocol converter of claim 1, wherein the converter controller is configured to change the value of the first counter when a predetermined time or longer elapses after a last time the converter controller changes the value of the first counter.

3. The protocol converter of claim 2, wherein the protocol converter is configured to be connected to the device control apparatus via a data bus.

4. The protocol converter of claim 1, wherein the protocol converter is configured to be connected to the device control apparatus via a data bus.

5. A data transmission system comprising:
   the protocol converter of claim 1;
   the device control apparatus; and
   a storage apparatus configured to function as the converter storage;
   wherein the device control apparatus is configured to acquire the field data written to the storage apparatus and copy the value of the first counter to the second counter when the value of the first counter and the value of the second counter are different.

6. The protocol converter of claim 1, wherein, in case when the value of the first counter and the value of the second counter are equal, the data set written in the converter storage is discarded when read by the device control apparatus.

7. A data transmission method to be executed by a protocol converter configured to be connected between a field device and a device control apparatus and comprising a converter storage, the data transmission method comprising:
   acquiring field data from the field device;
   when a value of a first counter controlled by the protocol converter and a value of a second counter controlled by the device control apparatus are equal, writing the field data to the converter storage as a data set formed by a plurality of pieces of data without further interpreting a content of the data set and changing the value of the first counter, regardless of elapsing of time, under the condition that all of the data forming the data set has been written to the converter storage; and when the value of the first counter and the value of the second counter are different, stopping an operation to write the field data to the converter storage, wherein the protocol converter converts the data outputted by the field device to data transmittable to the device control apparatus, thereby placing the data in a state acquirable by the device control apparatus.

8. A non-transitory computer-readable medium storing a data transmission program comprising instructions which, when executed by a protocol converter configured to be connected between a field device and a device control apparatus and comprising a converter storage, cause the protocol converter to:

acquire field data from the field device;

when a value of a first counter controlled by the protocol converter and a value of a second counter controlled by the device control apparatus are equal, write the field data to the converter storage as a data set formed by a plurality of pieces of data without further interpreting a content of the data set and change the value of the first counter, regardless of elapsing of time, under the condition that all of the data forming the data set has been written to the converter storage; and when the value of the first counter and the value of the second counter are different, stop an operation to write the field data to the converter storage, wherein the protocol converter converts the data outputted by the field device to data transmittable to the device control apparatus, thereby placing the data in a state acquirable by the device control apparatus.

* * * * *